UNITED STATES PATENT OFFICE.

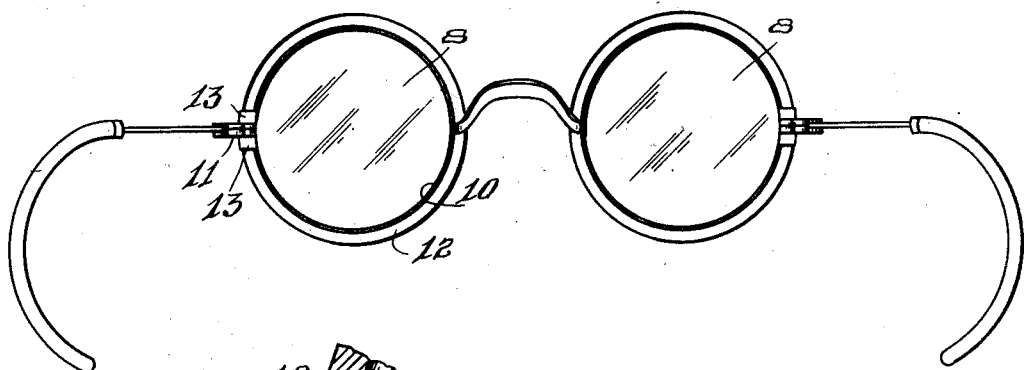

WILLIAM E. McDONELL, OF ROCHESTER, NEW YORK, ASSIGNOR TO E. KIRSTEIN SONS COMPANY, OF ROCHESTER, NEW YORK, A CORPORATION.

OPHTHALMIC-LENS FRAME.

1,362,715.

Specification of Letters Patent.  Patented Dec. 21, 1920.

Application filed September 25, 1919. Serial No. 326,185.

*To all whom it may concern:*

Be it known that I, WILLIAM E. McDONELL, a citizen of the United States, and resident of Rochester, in the county of Monroe and State of New York, have invented certain new and useful Improvements in Ophthalmic-Lens Frames, of which the following is a specification.

The present invention relates to ophthalmic lens frames and more particularly to the type in which each lens is secured within an inner metallic rim surrounded by an outer rim of non-metallic material, such for instance as xylonite or celluloid, an object of this invention being to provide a strong and durable means of simple construction for securing the outer rim about the inner rim.

To this and other ends, the invention consists of certain parts and combinations of parts, all of which will be hereinafter described, the novel features being pointed out in the appended claim.

In the drawings:

Figure 1 is a rear view of a pair of spectacles embodying the present invention;

Fig. 2 is an enlarged fragmentary view partially in section adjacent the split of one of the lens frames;

Fig. 3 is an enlarged section on the line 3—3, Fig. 2;

Fig. 4 is an enlarged section on the line 4—4, Fig. 2;

Fig. 5 is a detail view of one of the clasps;

Fig. 6 is a side view of one of the clasps partially in section; and

Fig. 7 is a section on the line 7—7, Fig. 2.

Referring more particularly to the drawings, 8 indicates the lenses, each of which is received at its edge in a groove 9 formed on the inner periphery of an inner metallic rim 10, this rim being split and having at the split terminals 11 between which the end of a temple of any suitable construction is secured in the usual manner. Surrounding each inner metallic rim 10 is a non-metallic rim 12 formed in this instance of xylonite, celluloid, or other similar material and having a groove on its inner periphery in which the metallic rim is received.

Prior to this invention the non-metallic rims have been secured to the metallic rims by clasps or clips of sheet metal secured to the terminals by solder. With this arrangement the clips or clasps readily break off and in some instances solder will spread and interfere with the proper action of the clasps. According to this invention the clips or clasps 13 are each formed from sheet metal and provided with a depending lug 14 which is fitted in an opening 15 formed in a terminal 11, this lug being upset at 16 on the opposite sides of the terminal so as to hold the clasp to the terminal. With this arrangement a firm and durable connection between the clasps and the terminals is provided which will not break so readily and which at the same time leaves the sides of the clasps free for bending about the non-metallic rim in the manner shown in Fig. 4. It is preferred also to provide the inner face of the clip with a projection 17 which is passed through a transverse opening 18 in the non-metallic rim 12 so that the non-metallic rim is not only clasped or clamped at its sides, but is also held by the lug or projection 17.

From the foregoing it will be seen that there has been provided a new fastening means for securing a non-metallic rim about a metallic rim. This fastening means is so connected to the temple securing terminals that it is less liable to breakage while at the same time the sides of the clasp or fastening means are free for bending about the non-metallic rim.

What I claim as my invention and desire to secure by Letters Patent is:

An ophthalmic lens frame comprising a split inner metallic rim having temple securing terminals at the split provided with openings, an outer non-metallic rim, and fastening means for securing the non-metallic rim to the metallic rim embodying clasps engaging about the non-metallic rim adjacent the terminals and each having a central projection secured in an opening in the adjacent terminal, the sides of the clasps projecting on opposite sides of the projection so that the clasps may be bent around the non-metallic rim without strain on the projection.

WILLIAM E. McDONELL.